United States Patent
Hashimoto et al.

(10) Patent No.: US 6,274,247 B1
(45) Date of Patent: *Aug. 14, 2001

(54) LOW-HEAT-SHRINKAGE POLYESTER SUPPORT AND HEAT-DEVELOPMENT PHOTOGRAPHIC LIGHT-SENSITIVE MATERIAL

(75) Inventors: Kiyokazu Hashimoto, Minami-ashigara; Sumio Nishikawa, Fujinomiya, both of (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,633

(22) Filed: May 25, 1999

(30) Foreign Application Priority Data

May 25, 1998 (JP) .................................................. 10-143509
Jul. 13, 1998 (JP) .................................................. 10-197483

(51) Int. Cl.[7] ........................... B32B 27/08; B32B 27/30; B32B 27/36; G03C 1/76; G03C 1/795
(52) U.S. Cl. ........................ 428/480; 428/421; 428/483; 428/522; 430/523; 430/531; 430/533; 430/534; 430/535; 430/542
(58) Field of Search ..................................... 428/480, 421, 428/483, 522; 264/280; 430/523, 531, 533, 542, 535, 534

(56) References Cited

U.S. PATENT DOCUMENTS 6,060,226 * 5/2000 Hashimoto ............................ 430/496

FOREIGN PATENT DOCUMENTS 8211547    8/1996  (JP) .

* cited by examiner

*Primary Examiner*—Vivian Chen
(74) *Attorney, Agent, or Firm*—Burns, Doane, Swecker & Mathis, LLP

(57) ABSTRACT

There is disclosed a polyester support, which has the dimensional change with the lapse of time after heating which corresponds to heat development, in a range of from −0.03% to +0.05% both in the longitudinal direction and the transverse direction. There is also disclosed a low-heat-shrinkage film, which has a dimensional change immediately after a heat treatment, which corresponds to a heat development, in a range of from 0% to +0.05% in both the longitudinal direction and the transverse direction. There is also disclosed a heat-development photographic light-sensitivity material, which comprises the support or the film as a support.

36 Claims, No Drawings

LOW-HEAT-SHRINKAGE POLYESTER SUPPORT AND HEAT-DEVELOPMENT PHOTOGRAPHIC LIGHT-SENSITIVE MATERIAL

FIELD OF THE INVENTION

The present invention relates to a low-heat-shrinkage film, and particularly to a low-heat-shrinkage polyester film. The present invention also relates to a low-heat-shrinkage heat-development photographic light-sensitive material using the film as a support.

BACKGROUND OF THE INVENTION

Hitherto, for a silver halide photographic light-sensitive material, a wet development has been applied using a developing solution after photographing. However, the method has the following inconveniences, and improvement has been desired.

[1] Because development, bleaching, fixing, and drying are carried out, a long time is required for the development processing.

[2] Because plural tanks containing a developing solution are required, a processor cannot be made small in size and light in weight.

[3] Inconveniences, such as the replenishment of a developing solution, the disposal of processing liquids, washing of developing tanks, etc., are required.

As described in the above, since a silver halide photographic light-sensitive material has been subjected to a complicated processing, some users have not been able to use it.

In order to improve that, photographic light-sensitive materials that are processed using a development method by heating (hereinafter, referred to as "heat development") to a temperature of from 80 to 150° C. are proposed, as described in, for example, the specification of U.S. Pat. No. 3,152,904, the specification of U.S. Pat. No. 3,457,075, JP-B-43-4921 ("JP-B" means an examined Japanese patent publication), and JP-B-43-4924. One example is a method of previously incorporating a precursor for a developing agent in a light-sensitive layer, decomposing the precursor by heating, to form a developing agent, and subjecting to development. In such a heat-development system, the development processing may be carried out by only applying heat, whereby the processing can be carried out in a short time and a processor can be small in size. Furthermore, the system has such characteristics that there are no inconveniences with the replenishment and the disposal of a developing solution.

However, when the light-sensitive material of this system was applied to a printing light-sensitive material, when 4 plates (blue, green, red, and black plates) were piled up, there was a problem that color discrepancy and distortion of an image were caused by the dimensional change that occurred during heat development. To solve the problem, a method of heat treating under a low tension is disclosed in JP-A-8-211547 ("JP-A" means unexamined published Japanese patent application). However, this method did not cause any problem of dimensional distortion when applied to a small-size plate of 45 cm or less, but a dimensional distortion occurred when it was applied to a larger-size plate exceeding the above size. Further, when the light-sensitive material according to the method was stored after heat development, with the lapse of time color discrepancy occurred as a result of the dimensional distortion. Therefore, this method also has a disadvantage in dimensional stability during storage, and there has been a need to solve the problem.

Further, in the above conventional methods, there is a problem that color discrepancy occurs as a result of dimensional change occurring immediately after a heat development, i.e., within three (3) hours after the heat development. This problem is especially serious in the production of a newspaper, in which exposure, development, and printing are conducted in a short time, and solution of the problem has been demanded.

SUMMARY OF THE INVENTION

An object of the present invention is to provide a low-heat-shrinkage polyester support excellent in dimensional stability. Another object of the present invention is to provide a heat-development photographic light-sensitive material that is excellent in dimensional stability during both heating and storage, and that is also capable of preventing from distortion of an image and color discrepancy.

Still another object of the present invention is to provide a low-heat-shrinkage film excellent in dimensional stability. Further another object of the present invention is to provide a heat-development photographic light-sensitive material having the film as a support.

Other and further objects, features, and advantages of the invention will appear more fully from the following description.

DETAILED DESCRIPTION OF THE INVENTION

That is, according to the present invention there are provided the following means:

(1) A polyester support, which has the dimensional change with the lapse of time after heating which corresponds to heat development, in a range of from −0.03% to +0.05% both in the longitudinal (machine) direction and the transverse (width-wise) direction;

(2) The polyester support as stated in the above (1), wherein the absolute value of a difference between the maximum and the minimum of the dimensional change with the lapse of time after heating which corresponds to heat development, that is measured along the transverse direction, is in a range of from 0% to +0.04% both in the longitudinal direction and the transverse direction;

(3) The polyester support as stated in the above (1) or (2), wherein the thermal dimensional change due to heating, which corresponds to heat development, is in a range of from −0.04% to +0.04% both in the longitudinal direction and the transverse direction;

(4) The polyester support as stated in the above (1), (2), or (3), wherein the absolute value of a difference between the maximum and the minimum of the thermal dimensional change due to heating, which corresponds to heat development, that is measured along the transverse direction, is in a range of from 0% to 0.04% both in the longitudinal direction and the transverse direction;

(5) The polyester support as stated in any one of the above (1) to (4), wherein the polyester support is subjected to heat treatment, so that the polyester shrinks in the longitudinal direction and stretches in the transverse direction, and also that the stretch in the transverse direction is completed before the completion of the shrinkage in the longitudinal direction;

(6) The polyester support as stated in the above (5), wherein the polyester is shrunk by the heat treatment in a range of from −2% to −0.2% in the longitudinal direction, compared to the polyester before the treatment, and the time necessary to complete the shrinkage is in a range of from 15 sec to 5 min;

(7) The polyester support as stated in the above (5), wherein the polyester is stretched by the heat treatment in a range of from more than 0% to +0.4% in the transverse direction, compared to the polyester before the treatment, and the time necessary to complete the stretch is in a range of from 5 sec to 20 sec;

(8) The polyester support as stated in the above (5), (6), or (7), wherein the heat treatment is carried out at a temperature of from 140° C. to 200° C. in a time of from 15 sec to 5 min;

(9) The polyester support as stated in any one of the above (5) to (8), wherein a ratio of the maximum to the minimum in the transverse direction of a thermal dimensional change amount at 120° C. for 30 sec is in a range of from 1 to 1.4 both in the longitudinal direction and the transverse direction, in terms of the polyester support before subjected to the heat treatment (the raw film); and

(10) A heat-development photographic light-sensitive material, which comprises the polyester support as stated in any one of the above (1) to (9), having coated thereon a silver halide photographic light-sensitive layer, wherein a dimensional change after heat development with the lapse of time is in a range of from −0.03% to +0.07% both in the longitudinal direction and the transverse direction (herein, the polyester supports stated in the above (1) to (9) and the heat-development photographic light-sensitive material stated in the above (10) are combined and referred to as a first invention of the present invention.), and

(11) A low-heat-shrinkage film, which has a dimensional change immediately after a heat treatment, which corresponds to a heat development, in a range of from 0% to +0.05% in both the longitudinal direction (MD) and the transverse direction (TD);

(12) The low-heat-shrinkage film as stated in the above (11), wherein a dimensional change before and after the heat treatment is from −0.04% to +0.04% in both the MD direction and the TD direction;

(13) The low-heat-shrinkage film as stated in the above (11) or (12), wherein the time needed to reach a half (½) of the saturated moisture absorption amount is from 1 hour to 100 hours;

(14) The film support as stated in the above (11), (12), or (13), wherein a moisture proof layer having a water vapor permeability coefficient of from 0 to $1 \times 10^{-8}$ ($cm^3$(STP) $\cdot cm^{-1} \cdot sec^{-1} \cdot cmHg^{-1}$) is laminated on the both sides of the low-heat-shrinkage support;

(15) The low-heat-shrinkage film as stated in the above (11), (12), (13), or (14), wherein the low-heat-shrinkage film is made of an aromatic polyester;

(16) The film as stated in the above (14) or (15), wherein the moisture proof layer comprises a polyvinylidene fluoride, a polyvinylidene chloride, or a polyvinyl alcohol;

(17) The film as stated in the above (16), wherein the moistureproof layer comprises a polyvinylidene chloride, and wherein a ratio I(c)/I(a) of an absorbance (I(c)) at 1043 $cm^{-1}$ that is originated in the crystalline property of the polymer, to an absorbance (I(a)) at 1069 $cm^{-1}$ that is originated in the amorphous property of the polymer, is from 1.2 to 2.5;

(18) A heat-development photographic light-sensitive material, which has a dimensional change immediately after a heat development is from 0% to +0.05% in both the MD and the TD;

(19) The heat-development photographic light-sensitive material as stated in the above (18), wherein a dimensional change before and after a heat development is from −0.04% to +0.04% in both the MD and the TD; and

(20) The heat-development photographic light-sensitive material as stated in the above (18) or (19), wherein the low-heat-shrinkage film as stated in any one of the above (11) to (17) is used as a support (herein, the low-heat-shrinkage films stated in the above (11) to (17) and the heat-development photographic light-sensitive material stated in the above (18) to (20) are combined and referred to as a second invention of the present invention.).

In the present specification, the present invention includes both the above first invention and second invention, unless otherwise specified.

First, the low-heat-shrinkage polyester support of the first invention is described.

In the low-heat-shrinkage polyester support of the first invention, a dimensional change after heating with the lapse of time, which corresponds to a heat development, is in a range of from −0.03% to +0.05% , more preferably from −0.02% to +0.04% , and further preferably from −0.01% to +0.03% , both in the longitudinal direction (hereinafter referred to as MD) and the transverse direction (hereinafter referred to as TD). In this specification, the terminology "a dimensional change with the lapse of time after heating which corresponds to a heat development" means a variation with time under the heat conditions corresponding to a heat development of a heat-development photographic light-sensitive material. That is, in the first invention, the dimensional change is defined by a ratio of a difference between $L(d\infty)$ and $L(d_0)$, to the $L(d_0)$, wherein the $L(d_0)$ is the size (dimensions) of a sample measured after 5 hours, the sample having been heated at 115° C. for 30 sec, and wherein the $L(d\infty)$ is the size of the sample compulsorily given a variation with time corresponding to at least three (3) years in terms of the natural lapse of time at 25° C., by allowing the sample to stand at 55° C. for 72 hours after the measurement of the $L(d_0)$ This is illustrated below according to processing steps:

| (Steps) Before heating → | The above- → described heating | After heating → | The above- → described variation with time | Natural lapse of time |
|---|---|---|---|---|
| (Length of Sample) L(f) | | $L(d_0)$ | | $L(d\infty)$ |

That is, the terminology "a dimensional change with the lapse of time after heating which corresponds to a heat development" is defined by $$100 \times \{L(d\infty) - L(d_0)\}/L(d_0)(\%),$$

and further the terminology "a thermal dimensional change due to heating, which corresponds to a heat development" is defined by $$100 \times \{L(d_0) - L(f)\}/L(f)(\%).$$

In this specification, "−" indicates shrinkage with the lapse of time, while "+" does stretch.

At this time, the dimensional change occurring between before and after the heating corresponding to the heat development is in a range of preferably from −0.04% to +0.04% , more preferably from −0.03% to +0.03% , and further preferably from −0.02% to +0.03% , in both MD and TD.

Further, when the dimensional change with the lapse of time after heating corresponding to the heat development is measured along the transverse direction of the support, the absolute value of a difference between the maximum and the minimum is preferably in a range of from 0% to 0.04%, more preferably from 0% to 0.03%, and further preferably from 0% to 0.02%, in both MD and TD. Further, when the thermal dimensional change due to heating corresponding to the heat development is measured along the transverse direction of the support, the absolute value of a difference between the maximum and the minimum is preferably in a range of from 0% to 0.04%, more preferably from 0% to 0.03%, and further preferably from 0% to 0.02%, in both MD and TD.

The particular dimensional change when heating corresponding to the heat development, and the particular dimensional change with the lapse of time after heating, and further a difference between the maximum and the minimum of these changes in the transverse direction, as specified in the first invention, are accomplished by a heat treatment, so that the polyester support shrinks in the MD and stretches in the TD, and further that the stretch in the TD has been completed before the completion of the shrinkage in the MD. That is, the first invention can be accomplished by carrying out such an anisotropic heat treatment that the MD is slowly shrunk, whereas the TD is quickly stretched.

A shrinking amount in the MD due to the heat treatment is preferably from −2% to −0.2%, more preferably from −1.5% to −0.4%, and further preferably from −1.2% to −0.5%. A time necessary to complete the shrinkage is preferably from 15 sec. to 5 min., more preferably from 20 sec. to 3 min., and further preferably from 30 sec. to 2 min.

A stretch amount in the TD due to the heat treatment is preferably from more than 0% to +0.4%, more preferably from 0.05% to +0.35%, and further preferably from 0.1% to +0.3%. Further, the time necessary to complete the stretch is preferably from 5 sec. to 20 sec., more preferably from 8 sec. to 18 sec., and further preferably from 10 sec. to 15 sec.

A heat treatment temperature is preferably from 140° C. to 200° C., more preferably from 145° C. to 180° C., and further preferably from 150° C. to 170° C. The temperature to be applied may be fixed, or may be increased or decreased within the above-mentioned range. The heat treatment time is preferably from 15 sec. to 5 min., more preferably from 25 sec. to 3 min., and further preferably from 30 sec. to 2 min.

A specific method for such an anisotropic heat treatment is not limited, since similar effects can be obtained by carrying out any one of methods therefor. As an example thereof, there is a method in which both ends of the support in the MD and the TD are clipped with a clip, and the clipped support is subjected to a heat treatment while dimensionally changing the same as described above.

Further, in order to regulate in a range as defined in the first invention, each of the absolute value of a difference between the maximum and the minimum of (i) a dimensional change with the lapse of time after heating corresponding to the heat development, and of (ii) a thermal dimensional change due to heating corresponding to the heat development, each measured along the transverse direction, it is preferred to use a polyester support having the following ratio in a specific range. That is, a ratio of the maximum to the minimum (the maximum/the minimum) in the transverse direction of a thermal dimensional changing amount at 120° C. for 30 sec. of the polyester support (the raw yard good film) not yet subjected to a heat treatment, measured along the transverse direction, is preferably from 1 to 1.4, more preferably from 1 to 1.3, and further preferably from 1 to 1.2, in both the MD and the TD.

In the present invention, preferably in the first invention, a width of the support is substantially preferably from 0.5 m to 8 m, more preferably from 0.8 m to 6 m, and further preferably from 1 m to 3 m. In the first invention, a thickness of the support is preferably from 50 $\mu$m to 250 $\mu$m, more preferably from 75 $\mu$m to 200 $\mu$m, and further preferably from 95 $\mu$m to 175 $\mu$m.

The polyester for use in the present invention, preferably in the first invention, is composed of a dicarboxylic acid component and a diol component. Preferred, of these polyesters, are those whose content of terephthalic acid or naphthalenedicarboxylic acid in the total dicarboxylic acid unit is from 50 mol % to 100 mol %. Of these polyesters, polyethylene terephthalate (PET) and polyethylene naphthalate (PEN) are particularly preferred. Intrinsic viscosity (hereinafter referred to as IV) of these polyesters measured at 25° C. in a phenol/tetrachloroethane=6/4 (weight ratio) solution, is preferably 0.4 or more, but 0.9 or less, and more preferably 0.45 or more, but 0.70 or less.

It is also preferable to add fine particles, such as $SiO_2$, $TiO_2$, $BaSO_4$, $CaCO_3$, talc, and kaolin, to give a sliding property to the polyester support. A preferable amount of the particles to be added is from 10 ppm or more, but 500 ppm or less. A preferable size of the particles to be added is from 0.05 $\mu$m to 5 $\mu$m.

A film of the polyester support can be formed according to a usual biaxial stretching method. That is, the polyester is extruded from a T-type die after melting at a temperature of the melting point of the polyester to 330° C., followed by quenching at a temperature of (Tg−80° C.) to Tg, to provide an unstretched film. Thereafter, MD stretching to from 2.8 to 3.8-fold and TD stretching to from 3.0 to 4.0-fold are carried out at a temperature of from (Tg+15° C.) to (Tg+50° C.), respectively, followed by thermal fixing at a temperature of from (Tm−50° C.) to (Tm−10° C.) and thermal relaxation (relaxation ratio 0 to 10%), to obtain a biaxially stretched film.

Next, the low-heat-shrinkage film of the second invention is described.

The low-heat-shrinkage film of the second invention has a dimensional change immediately after a heat development (corresponding to a heat treatment) that is in a range from 0% to +0.05%, more preferably from 0% to +0.04%, and further preferably from 0% to +0.03%, in both the MD (longitudinal direction) and the TD (crosswise direction). Further, the heat-development photographic light-sensitive material of the second invention has a dimensional change immediately after a heat development that is in a range from 0% to +0.05%, more preferably from 0% to +0.04%, and further preferably from 0% to +0.03%, in both the MD and the TD. The term "a dimensional change ($\Delta L$) immediately after a heat development" referred to in the second invention means a value defined by equation 1:

$$\Delta L(\%) = 100 \times (L120 - L3)/L3 \qquad \text{(Equation 1)}$$

$\Delta L$: Dimensional change immediately after heat development (corresponding to heat treatment)

L120: Dimensions measured after standing at 25° C., 75% RH for 120 minutes subsequent to heat development (115° C., 30 seconds)

L3: Dimensions measured after standing at 25° C., 75% RH for 3 minutes subsequent to heat development (115° C., 30 seconds)

Herein, "t" means that a size of a film stretches with the lapse of time.

As a result of our intensive investigation, we have made clear that this dimensional change immediately after heat development occurs according to the following mechanisms, and we have reached the second invention.

① A moisture in a film for a support evaporates during heat development.

② The moisture is adsorbed again onto the film during standing at a room temperature, so that the film stretches with correspondence to the adsorption. (It takes 1 to 5 hours for a PET film to adsorb that moisture thereon, and a dimensional change occurs during this period of time.)

In the second invention, a reasonableness of the following mechanism was investigated.
(1) Evaporation of a moisture being generated during a heat development is controlled.
(2) Moisture absorption after a heat development is quickly finished.

Consequently, a dimensional change before and after a heat development of both the support and the light-sensitive material in the second invention, is preferably from −0.04% to +0.04%, more preferably from −0.03% to +0.04%, and further preferably from −0.02% to +0.03%, in both the MD and the TD. The term "a dimensional changing rate (δ) before and after a heat development" used in this specification means a value obtained by the following equation 2:

$$\delta(\%) = 100 \times (Lf - Ld)/Lf \quad \text{(Equation 2)}$$

Lf: Equilibrium dimensions after humidifying a sample at 25° C. and 55% RH for one day, before a heat development.

Ld: Equilibrium dimensions after humidifying a sample at 25° C. and 55% RH for one day, after a heat development at 115° C. for 30 seconds.

As a result, the second invention has been accomplished by a film in which evaporation of a moisture being generated during a heat development (heat treatment) has been controlled.

That is, an object of the second invention has been accomplished by a film having on each of the both sides thereof, a moistureproof layer (a barrier layer) that is able to keep the moisture from evaporation, in which a water vapor permeability coefficient of the layer is generally from 0 to $1 \times 10^{-8}$ (cm$^3$(STP)·cm$^{-1}$·sec$^{-1}$·cmHg$^{-1}$), more preferably from 0 to $5 \times 10^{-9}$ (cm$^3$(STP)·cm$^{-1}$·sec$^{-1}$·cmHg$^{-1}$), and further preferably from 0 to $3 \times 10^{-9}$ (cm$^3$(STP)·cm$^{-1}$·sec$^{-1}$·cmHg$^{-1}$).

As a result, water-absorbing speed after a heat development decreases, so that the time needed to reach a half (½) of the saturated moisture absorption amount is controlled in a range of preferably from 1 hour to 100 hours, more preferably from 1 hour and a half to 50 hours, and further preferably from 2 hours to 20 hours.

In this specification, the term "the time needed to reach a half of the saturated moisture absorption amount" means the time required to reach an average dimension of these dimensions, in the course of getting to an equilibrium dimension of 70% RH from an equilibrium dimension of 20% RH as a result of having transferred a sample having been humidified at 25° C. and 20% RH to the humidification condition of 25° C. and 75% RH.

Examples of the material for use in a moistureproof layer include the following:

| | | Water vapor permeability coefficient (cm$^3$(STP)·cm$^{-1}$·sec$^{-1}$·cmHg$^{-1}$) |
|---|---|---|
| #1 | Polyvinylidene chloride | $1 \times 10^{-9}$ |
| #2 | Polyvinylidene fluoride | $1 \times 10^{-9}$ |
| #3 | High-density polyetylene | $1 \times 10^{-9}$ |
| #4 | Low-density polyetylene | $1 \times 10^{-8}$ |
| #5 | Rubber hydrochloride | $1 \times 10^{-9}$ |
| #6 | Polyvinyl alcohol | $9 \times 10^{-10}$ |
| #7 | Polyethylene/vinyl alcohol copolymer | $6 \times 10^{-10}$ |
| #8 | Vinyl chloride-acrylonitrile copolymer | $2 \times 10^{-9}$ |
| #9 | Polypropylene | $6 \times 10^{-9}$ |
| #10 | Ethylene tetrafluoride-ethylene copolymer | $1 \times 10^{-8}$ |
| #11 | Polyethylene naphthalate | $5 \times 10^{-9}$ |
| #12 | Silicon dioxide | 0 |
| #13 | Alumina | 0 |
| #14 | Talc | 0 |
| #15 | Metallic aluminum | 0 |
| #16 | Mica | 0 |
| #17 | Diatom earth | 0 |
| #18 | Titanium oxide | 0 |

Of these materials, the organic compounds of #1 to #11 are preferred to be coated on the both sides of a film. A preferable thickness per one side of the film is 1 μm or more but less than 10 μm, more preferably from 1.2 μm to 7 μm, and further preferably from 1.5 μm to 4 μm. More preferred of these compounds, are those of #1, #6, #3, #8, and #11. The compounds of #1 and #6 are furthermore preferred.

These compounds may be coated as a solution having the same dissolved in a solvent, or as a latex having the same dispersed in water. Alternatively, they may be co-extruded on a base film. These compounds may be used alone, or in a combination of two or more thereof as a laminated layer or a mixture. Further, fine particles such as SiO$_2$, TiO$_2$, BaSO$_4$, CaCO$_3$, talc, and kaolin may be added thereto in order to impart an easily sliding property, and/or crystalline metal oxides (e.g., ZnO, TiO$_2$, SnO$_2$), or fine particles of these composite oxides may be added in order to impart electric conductivity. Further, a dispersion of a solid dyestuff is also preferably added thereto.

Inorganic materials of #12 to 18 may be applied by a vacuum method such as vacuum evaporation coating, sputtering, and ion-plating. A binder method in which a mixture of the material and a small amount of a binder is applied, is also preferred. In the case of the vacuum method, vacuum evaporation coating is preferred from a production point of view. Of these compounds, the compound of #12 is especially preferred from a transparency point of view. Further, it is preferred to vacuum-evaporate the compound of #12 in combination with a fluoride of alkali earth, and/or a magnesium oxide, as described in JP-A-8-224795, to thereby further improve a barrier property.

The vacuum-evaporation layer may be a single layer, or may be a laminate composed of two or more compounds. A preferred thickness per one side of the vacuum-evaporation layer is from 10 nm to 1000 nm, more preferably 20 nm to 800 nm, and further preferably from 30 nm to 500 nm. In the case of the binder method, the inorganic compounds of #12 to 18 are each coated as a mixture of the compound and a binder in an amount of preferably from 0.1% to 100%, more preferably from 0.5% to 50%, and further preferably from 1.0% to 30%, in a volume ratio of the compound to the binder.

Any kind of binder may be used, so long as the same is a high polymer material, and more preferable examples thereof include polyester-series polymers (e.g., PET, PEN), polyamide-series polymers (e.g., nylon, gelatin), polyvinyl-series polymers (e.g., polyethylene, polypropylene, polyvinylidene chloride, syndiotactic, atactic, and isotactic polystyrene), cellulose derivatives (e.g., cellulose nitrate, cellulose acetate), polycarbonates, and polyolefin-series polymers (e.g., polyethylene, polypropylene, styrene butadiene rubber).

Of these polymers, gelatins, polyolefins, polyvinylidene chloride, and styrene butadiene rubbers are especially preferred. In the case of the binder method, a binder and the inorganic compounds of #12 to 18 may be coated on a support as a mixture thereof with an organic solvent, or each of the inorganic compounds may be coated on a film as a mixture of the same and an aqueous solution of the latex-dispersed binder. Further, the inorganic material may be kneaded in a binder melted at a high temperature, followed by co-extrusion. In the case of the binder method, the calendering is preferred in order to minimize an interval of the inorganic compounds.

Further, a layer composed of at least one of these inorganic compounds may be laminated with a layer composed of at least one of the above organic compounds of #1 to 11.

A film that is a base carrying thereon the moistureproof layer is preferably a thermoplastic resin, and a polyester resin is especially preferred from the view points of mechanical strength, thermal dimensional stability, and transparency.

Of these resins, are furthermore preferred aromatic polyester resins, with specific examples including polyethylene terephthalate and polyethylene naphthalate. The thickness of the film is preferably from 50 $\mu$m to 500 $\mu$m, more preferably from 75 $\mu$m to 300 $\mu$m, and further preferably from 90 $\mu$m to 200 $\mu$m.

Prior to applying these layers to the base film, a surface of the base film is preferably subjected to a surface treatment such as a glow discharge treatment as described in, for example, JP-A-8-194286, a corona treatment as described in, for example, JP-B-48-5043, an ultraviolet ray treatment as described in, for example, JP-B-43-2603, and a flame treatment, to thereby improve adherence.

An application of such a barrier layer has an effect on that an amount of moisture to be evaporated during a heat development can be reduced, and also the moisture absorption speed after the heat development can be controlled. As a result, this also has an effect on that a dimensional change due to a rush moisture absorption after the heat development does not occur, and that a dimensional change due to a time lag after four (4) printing-plates heat-development can also be reduced.

Further, the polyester support of the first invention is preferably provided a coating layer on one side or both sides thereof. The coating layer may be applied thereto before or after the above-described heat treatment, but it is preferred that an undercoat (subbing) layer and a backing layer, each of which must be dried at a high temperature, are applied before the heat treatment, whereas a light-sensitive layer that should be dried at a low temperature, is done after the heat treatment.

Further, a light-sensitive material is prepared using the low-heat-shrinkage film of the second invention as a support (herein, such a film is referred to as a support, when used for the light-sensitive material). Prior to a coating of a light-sensitive layer, it is preferred to apply a backing layer (BC layer) to the side of the support opposite to a light-sensitive layer, and an undercoat layer to the same side of the support as the light-sensitive layer.

These undercoat layer and backing layer may be coated directly onto the support. Alternatively, prior to the coating of the undercoat layer and the backing layer, it is preferable to conduct a glow discharge treatment (e.g., JP-A-8-194286), a corona treatment (e.g., JP-B-48-5043), an ultraviolet ray treatment (e.g., JP-B-43-2603), and a flame treatment.

For the undercoat layer, the following coating methods are available: a so-called multilayer method, in which a layer that is able to adhere well to a support is coated on the support, as the first layer (hereinafter referred to as the first undercoat layer), and a layer that is able to adhere well to both the photographic constituting layer and the first undercoat layer, as the second layer (hereinafter referred to as the second undercoat layer), is further coated on the first undercoat layer; and a single layer method, in which a single layer that is able to adhere well to both a support and a photographic layer is coated.

In the first undercoat layer according to the multilayer method, the following polymers can be used: for example, copolymers produced by using monomers selected from vinyl chloride, vinylidene chloride, butadiene, vinyl acetate, styrene, acrylonitrile, methacrylate, methacrylic acid, acrylic acid, itaconic acid, maleic anhydride, and the like, as a starting material; and other polymers, such as epoxy resins, gelatin, nitrocellulose, and polyvinyl acetate. Further, if necessary, crosslinking agents, such as a triazine-series, epoxy-series, melamine-series, isocyanate-series (including blockisocyanates), aziridine-series, and oxazaline-series; inorganic grains, such as colloidal silica, surface active agents, thickening agents, dyes, and antiseptic agents, can be added. Further, use can be made of gelatin as a main polymer for the second undercoat layer.

In the single layer method, a method in which good adhesion can be achieved by swelling a support, followed by an interfacial mixing of the swollen support with an undercoat polymer, is often used. Examples of the undercoat polymers that can be used, include a water-soluble polymer, such as gelatin, gelatin derivatives, casein, agar-agar, sodium alginate, starch, polyvinyl alcohol, a polyacrlylic acid-based copolymer, and a maleic anhydride-based copolymer; a cellulose ester, such as carboxymethyl cellulose and hydroxyethyl cellulose; and a latex polymer, such as a vinyl chloride-containing copolymer, a vinylidene chloride-containing copolymer, an acrylic acid ester-containing copolymer, and a vinyl acetate-containing copolymer. Among these, gelatin is preferable to be used. As the gelatin, use can be made of any of gelatins usually used in the art, and, among these gelatins, lime-processed gelatin, and acid-processed gelatin are most preferable to be used.

A backing layer(s) is preferably coated for imparting, for example, scratch-resistance, a sliding property, curl compensation, and an anti-static capability for a backing surface. In the backing layer, a hydrophilic colloid or a hydrophobic polymer may be used as a binder.

Gelatin is the most preferable hydrophilic colloid. When a hydrophilic polymer is used, preferably a backing layer is coated on the same undercoat layer as that of a light-sensitive layer, in order to give thereto a firmer adhesion.

Examples of a binder for use in the hydrophobic polymer layer include (meth)acrylic acid ester-based polymers, such as polymethyl methacrylate and polyethyl acrylate; olefin-series polymers, such as polyethylene; stylene-series polymers, poly(vinylidene chloride), urethane-series polymers; and rubber-series polymers, such as polybutadiene.

The hydrophobic polymer layer may be a single layer or multiple layers.

If necessary, a matting agent, a sliding agent, an electrification-regulating (autistatic-regulating) agent, a surface-active agent, and a crosslinking agent may be added to the backing layer and/or the undercoat layer.

As an electrification-regulating agent, electrically conductive fine grains of crystalline metal oxides or composite oxides thereof are preferably added, to make a surface resistivity of $10^{12}\Omega$ or less. These electrically conductive fine grains of crystalline metal oxides or their composite oxides, preferably have a volume resistivity of $10^7\Omega$ cm or less, more preferably $10^5\Omega$ cm or less. Further, their grain size is preferably from 0.01 to 0.7 $\mu$m, and particularly preferably from 0.02 to 0.5 $\mu$m.

A method of producing these electrically conductive fine grains of crystalline metal oxides or composite oxides is fully described in a specification of JP-A-56-143430. For example, the first method, in which metal oxide fine grains are produced by burning, and then they are subjected to a heat treatment in the presence of a hetero atom that gives improved electrical conductivity; the second method, in which a hetero atom, for improving electrical conductivity, is coexisted when metal oxide fine grains are produced by burning; and the third method, in which an oxygen defect is formed by reducing the oxygen concentration in the atmosphere, when metal fine grains are produced by burning; and the like, are easily carried out. Examples of composite oxides containing metal atoms include ZnO containing Al, In, or the like; $TiO_2$ containing Nb, Ta, or the like; and $SnO_2$ containing Sb, Nb, halogen elements, or the like. The amount of hetero atoms to be added is preferably from 0.01 to 30 mol %, and particularly preferably from 0.1 to 10 mol %. $SnO_2$ composite metal oxide fine grains to which Sb is added, are most preferred of these grains.

Further, a dyed light-insensitive hydrophilic colloid layer (hereinafter referred to as a dyed layer) may be applied for purposes of antihalation, improvement of safelight safety, and improvement of the distinguishing property of the front and back sides (for example, as described in U.S. Pat. No. 3,455,693, JP-A-61-213839, Japanese patent application No. 1-142688, U.S. Pat. No. 2,719,088, and Japanese patent application Nos. 1-119851 and 1-87367). Of these, the method in which a solid dye is dispersed as it is, is preferred.

Such a backing layer or undercoat layer each may be a single layer or a multilayer. The thickness of each layer is preferably from 0.02 to 10 $\mu$m, and more preferably from 0.1 to 7 $\mu$m. The total thickness of these layers is preferably from 0 to 5 $\mu$m.

These backing layers and undercoat layers can be coated on a support by any one of generally well-known methods, such as a dip coating, an air-knife coating, a curtain coating, a roller coating, a wirebar coating, and a gravure coating. Further, these layers may be coated singly or multilayers are coated simultaneously.

Further, in the second invention, preferably the support is heat-treated at a low tension. By this heat treatment, a dimensional change of the support before and after a heat development can be controlled in a range of preferably from −0.04% to +0.04%, more preferably from −0.03% to +0.04%, and further preferably from −0.02% to +0.03%, in both the MD and the TD.

Preferably, such a low-tension heat-treatment is carried out at a temperature of from 135° C. to 200° C., more preferably from 145° C. to 180° C., and further preferably from 155° C. to 170° C., for a period of time ranging from 20 sec. to 5 min., more preferably from 30 sec. to 4 min., and further preferably from 40 sec. to 3 min. Further, a tension at which the heat treatment is carried out, is preferably from 0.3 kg/cm² to 15 kg/cm², more preferably from 0.5 kg/cm² to 8 kg/cm², and further preferably from 0.8 kg/cm² to 3 kg/cm².

The heat treatment may be carried out at any stage after a film production of the support, but before a coating of a light-sensitive layer. The heat treatment is most preferably done at the stage after a coating of both a backing layer and an undercoat layer, but before a coating of a light-sensitive layer. By carrying out the heat treatment after a coating of both a backing layer and an undercoat layer, a surface deposition of oligomers existing in a support can be suppressed, so that an increase of a haze occurring by a heat treatment can be restrained.

Further, in order to improve a barrier property of the moistureproof layer, a heat treatment at low temperature (a low-temperature treatment of the moistureproof layer) is preferably carried out in the second invention. A preferable temperature for the heat treatment is from 35 to 140° C., more preferably from 40° C. to 130° C., and further preferably from 45° C. to 120° C., and the time required for the heat treatment at 35° C. is preferably from 12 hours to 1 week, more preferably from 16 hours to 4 days, and further preferably from 20 hours to 2 days. In the case of 140° C., it is preferably from 0.1 minute to 1 hour, more preferably from 0.2 minute to 20 minutes, and further preferably from 0.4 minute to 5 minutes. Such a heat treatment may be carried out while conveying a support, or may be done after the support has been rolled. However, if the support is exposed to the temperature of higher than 150° C. after the above-described heat treatment, a barrier property of the moistureproof layer inversely decreases, and therefore such a heat treatment is preferably carried out after the above-mentioned low-tension heat-treatment has been done.

Especially when a polyvinylidene chloride is used as a barrier layer, crystallinity becomes higher by such a heat treatment, to thereby increase a barrier property. This property can be measured under the following conditions, using ATR-IR (total reflection infrared spectroscopy).

That is, a ratio of absorbance (I(c)) at 1043 cm$^{-1}$ originating in the crystalline property of the above-mentioned polymer, to absorbance (I(a)) at 1069 cm$^{-1}$ originating in the amorphous property of the same polymer (I(c)/I(a)), is controlled in a range of preferably from 1.2 to 2.5, more preferably from 1.3 to 2.3, and most preferably from 1.4 to 2.0.

The ATR-IR measurement is carried out using a KRS-5 crystal plate, and integration by 50 times is performed at an angle of incidence of 60°. The points between 1210 cm$^{-1}$ and 920 cm$^{-1}$ are connected by a straight line, which is used as a base line, to obtain absorbance at 1043 cm$^{-1}$ and 1069 cm-1, respectively.

By coating a photographic light-sensitive layer onto the thus-obtained support of the first invention, there can be attained a heat-development light-sensitive material of the first invention, i.e., the light-sensitive material that has a dimensional change with the lapse of time after a heat development in a range of from −0.03% to +0.07%, more preferably from −0.02% to +0.06%, and further preferably from −0.01% to +0.05%, both in the longitudinal direction and the transverse direction.

Further, by coating a heat-development photographic light-sensitive layer onto the thus-obtained support of the second invention, a light-sensitive material of the second invention, i.e., the heat-development photographic light-sensitive material as described in the above (18), wherein a dimensional change at immediately after a heat development is from 0% to +0.05% in both the MD and the TD, and a dimensional change before and after the heat development is preferably from −0.04% to +0.04% in both the MD and the TD, can be prepared.

The heat-development light-sensitive material is a light-sensitive material that is capable of forming an image by subjecting to heat-development a latent image formed upon exposure to radiation, for a period of time of preferably from 3 sec. to 10 min., more preferably from 5 sec. to 3 min., and further preferably from 10 sec. to 1 min., at a temperature of preferably from 50° C. to 180° C., more preferably from 70° C. to 150° C., and further preferably from 90° C. to 135° C., without using any aqueous developing solution. Examples of light-sensitive substances for use in such a light-sensitive material include organic light-sensitive substances such as a diazonium salt, and inorganic light-sensitive substances such as a silver halide. Of these, light-sensitive materials using a silver halide are preferred, because they are excellent in photographic speed (sensitivity) and contrast.

As a heat-development photographic light-sensitive layer, use can be made of those described, for example, in JP-A-5-224371 and JP-A-10-10676.

A light-sensitive layer is formed by adding a silver halide, a silver salt of an organic acid, and the like to a binder. Examples of the binder include a latex of a styrene/butadiene/acrylonitricle copolymer (SBR), a vinylidene chloride (PVdC)-series copolymer, a polyacrylate-series polymer, a vinyl acetate resin, a polyurethane resin, a polyolefin resin, or a polymethacrylate-series polymer. The molecular weight (Mw) of these polymers or resins is preferably from 5,000 to 1,000,000, and more preferably from 10,000 to 200,000. More specifically, examples of the acrylic resins include Sevian A-4635, 46583, and 4601 (trade names, manufactured by Daicellu Chemical Industries, Ltd.), and Nipol Lx811, 814, 824, 820, and 857 (trade names, manufactured by Nippon Zeon Co., Ltd.). Examples of the rubber-series resins include LACSTAR 7310K, 3307B, 4700H, and 7132C (trade names, manufactured by Dainippon Ink & Chemicals Incorporated), and Nipol Lx416, 410, 438c, and 2507 (trade names, manufactured by Nippon Zeon Co., Ltd.). Examples of the vinylidene chloride resins include L502 and L513 (trade names, manufactured by Asahi Chemical Industry Co., Ltd.). Examples of the olefin resins include Chemipearl S120 and SA100 (trade names, manufactured by Mitsui Chemicals, Inc.). These resins may be used singly or in combination thereof. The density of the solid content in these latexes is preferably from 10% to 80%, and more preferably from 20% to 70%.

Further, it is also preferred that a water-soluble polymer is used, such as gelatin, a water-soluble polyester (for example, PET copolymerized with slufo-isophthalic acid), poly(vinyl pyrrolidone), starch, gum-arabic, poly(vinyl alcohol), polyacrylic acid, polymethacrylic acid, chitin, and chitosan. The molecular weight (Mw) of these polymers is preferably from 5,000 to 1,000,000, and more preferably from 10,000 to 200,000. These may be used singly or in combination thereof.

Further, a silver salt of an organic acid is preferably added to a light-sensitive layer. A preferable organic acid of the silver salt is an aliphatic carboxylic acid having 10 to 30 carbon atoms. More preferable examples of the silver salt include silver behenate, silver arachidate, silver stearate, silver oleate, silver laurate, silver hexanoate (caproate), silver myristate, silver pulmitate, silver maleate, silver fumalate, silver linolate, silver butyrate, and silver oxalate. Among these silver salts, silver behenate is preferred.

These silver salts of organic acids are preferably dispersed and coated. As a dispersant, it is also preferred to use a polymer, such as a polyvinyl alcohol, a polyethylene glycol, a polyacrylic acid, an acrylic acid copolymer, a maleic acid copolymer, an acryloylmethylpropanesulfonic acid copolymer, a carboxymethyl cellulose, and a carboxymethyl starch; anionic surfactants as described in JP-A-52-92716 and WO88/047974; and known anionic, nonionic, and cationic surfactants.

A light-sensitive silver halide is used in a light-sensitive layer. For example, those as described in Research Disclosure (June 1978) No. 17029 and U.S. Pat. No. 3,700,458, can be used. The silver halide is preferably used in an amount of 0.01 to 0.5 mol per mol of the silver salt of an organic acid. If necessary, it is preferred to incorporate therein at least one of complexes of the metal selected from a group consisting of rhodium, rhenium, ruthenium, osmium, iridium, cobalt, mercury, and iron, in an amount of 1 n mol to 10 m mol, per mol of silver. Further, a sulfur sensitization, a selenium sensitization, or a tellurium sensitization can also be used.

Further, a nucleating agent is preferably added thereto. Examples of the nucleating agent include amine derivatives, onium salts, disulfide derivatives, hydroxymethyl derivatives, hydroxame derivatives, acylhydrazide derivatives, acrylonitrile derivatives, and hydrogen donors. Of these, hydrazine derivatives having the structure shown by the following formula are preferred:

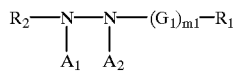

wherein $R_2$ represents an aliphatic group, an aromatic group, or a heterocyclic group; $R_1$ represents a hydrogen atom or a blocking group; $G_1$ represents a —CO—, —COCO—, —C(=S)—, —SO$_2$—, —SO—, or —PO(R$_3$)— group (in which $R_3$ is selected from those defined for $R_1$, and $R_3$ and $R_1$ may be different from each other), or an iminomethylene group; $A_1$ and $A_2$ each represent a hydrogen atom, or one of them is a hydrogen atom, and the other is a substituted or unsubstituted alkylsulfonyl group, a substituted or unsubstituted arylsulfonyl group, or a substituted or unsubstituted acyl group; $m_1$ is 0 or 1, and when $m_1$ is 0, $R_1$ represents an aliphatic group, an aromatic group, or a heterocyclic group.

Further, it is also preferred to use a sensitizing dye, such as a cyanine dye, a merocyanine dye, a complex cyanine dye, a complex merocyanine dye, a holopolar cyanine dye, a styryl dye, a hemicyanine dye, an oxonol dye, and a hemioxonol dye.

An antifogging agent can be used; examples include thiazonium salts as described in, for example, U.S. Pat. No. 2,694,716; azaindenes as described in, for example, U.S. Pat. No. 2,444,605; urazoles as described in, for example, U.S. Pat. No. 3,287,135; mercury salts as described in, for example, U.S. Pat. No. 2,728,663; and organic halogen compounds as described in, for example, JP-A-6-208191, JP-A-7-5621, JP-A-8-15809, and U.S. Pat. No. 5,464,773.

Mercapto compounds, disulfide compounds, and thion compounds are also preferably used for controlling (inhibition of) development.

A reducing agent is also preferably added to a light-sensitive layer. Examples of the reducing agent include those described in, for example, JP-B-54-20333, JP-B-49-10727, JP-A-4-56848, JP-A-61-183642, JP-A-54-156525, JP-A-53-1020, JP-A-52-14788, JP-A-51-3223, JP-A-50-67132, and U.S. Pat. Nos. 4,510,236, 4,123,282, 3,782,941, and 3,080,254.

A dye or a pigment for antihalation are also preferably incorporated in a light-sensitive layer. Examples of them include a pyrazoloazole dye, an anthraquinone dye, an azo dye, an azomethine dye, an oxonol dye, a carbocyanine dye, a styryl dye, a triphenylmethane dye, an indoaniline dye, an indophenol dye, and phthalocyanine. These compounds may be added to a light-sensitive layer and/or a backing layer.

The total thickness of these light-sensitive layers is generally from 5 µm to 25 µm, and preferably from 8 µm to 20 µm.

In the present invention, may be added other various photographic additives in accordance with the purpose. These additives are described in more detail in Research Disclosures, and the particular parts are shown below.

| Additive | | RD 17643 | RD 18716 | RD 307105 |
|---|---|---|---|---|
| 1 | Chemical sensitizers | p. 23 | p. 648 (right column) | p. 866 |
| 2 | Sensitivity-enhancing agents | — | p. 648 (right column) | — |
| 3 | Spectral sensitizers and Supersensitizers | pp. 23–24 | pp. 648 (right column)–649 (right column) | pp. 866–868 |
| 4 | Brightening agents | p. 24 | p. 647 (right column) | p. 868 |
| 5 | Light absorbers, Filter dyes, and UV Absorbers | pp. 25–26 | pp. 649 (right column)–650 (left column) | p. 873 |
| 6 | Binders | p. 26 | p. 651 (left column) | pp. 873–874 |
| 7 | Plasticizers and Lubricants | p. 27 | p. 650 (right column) | p. 876 |
| 8 | Coating aids and Surfactants | pp. 26–27 | p. 650 (right column) | pp. 875–876 |
| 9 | Antistatic agents | p. 27 | p. 650 (right column) | pp. 876–877 |
| 10 | Matting agent | | | pp. 878–879 |

The measurement methods of the dimensional stability defined in this specification are described below.

(1) Dimensional change with the lapse of time after heating which corresponds to heat development A sample was cut to the size of 5 cm width in the transverse direction (TD) and 25 cm length in the longitudinal direction (MD), and holes with an interval of 20 cm were formed. This sample was heated for 30 sec. in contact with a heat block heated to 115° C., under the non-tension. After humidifying the sample at 25° C. and 60% RH for 5 hours, the interval of the holes was measured using a pin gauge (the length is defined as $L(d_0)$). Thereafter, the sample was subjected to a heat treatment in an air thermostatic chamber at 55° C. for 72 hours (these conditions correspond to 3 years or more in terms of the natural lapse of time at 25° C.). Thereafter, the sample was humidified again at 25° C. and 60% RH for 5 hours, and the interval of the holes was measured using a pin gauge (the length is defined as $L(d\infty)$). Based on these lengths, $100\times\{L(d\infty)-L(d_0)\}/L(d_0)$ was calculated.

These lengths at the 5 points formed at regular intervals along the transverse direction were measured and averaged for each of MD and TD. These average values thus obtained were defined as "a dimensional change with the lapse of time after heating corresponding to a heat development" (%). Further, from the measured values at the 5 points along the transverse direction, the maximum and the minimum were selected for each of the MD and the TD, and the absolute value of a difference between them was defined as "a difference between the maximum and the minimum in the transverse direction of a dimensional change with the lapse of time after heating corresponding to a heat development" (%).

(2) Dimensional change due to heating, which corresponds to heat development

A sample was cut to the size of 5 cm width and 25 cm length in MD and TD, and it was humidified at 25° C. and 60% RH for 5 hours. Then, holes with an interval of 20 cm were formed on the sample. Thereafter, the interval of the holes was measured using a pin gauge (the length is defined as $L(f)$). This sample was heated for 30 sec. in contact with a heat block heated to 115° C., under the non-tension. This sample was humidified at 25° C., 60% RH for 5 hours, and the interval of the holes was measured using a pin gauge (the length is defined as $L(d_0)$). Based on these lengths, $100\times\{L(d_0)-L(f)\}/L(f)$ was calculated.

These lengths at the 5 points formed at regular intervals along the transverse direction were measured and averaged for each of MD and TD. These average values thus-obtained were defined as "a dimensional change due to heating corresponding to a heat development" (%). Further, from the measured values at the 5 points along the transverse direction, the maximum and the minimum were selected for each of the MD and the TD, and the absolute value of a difference between them was defined as "a difference between the maximum and the minimum in the transverse direction of a dimensional change due to heating corresponding to a heat development" (%).

(3) Ratio of the maximum to the minimum in the transverse direction of dimensional changing amount obtained by heating at 120° C. for 30 sec. a polyester support not yet subjected to a heat treatment (a raw film)

Samples were each cut to the size of 5 cm width and 25 cm length in MD and TD, at the 5 points located at regular intervals in the transverse direction of the polyester-support that has not yet subjected to a heat treatment (a raw film). These samples were humidified at 25° C., 60% RH for 5 hours, and holes with an interval of 20 cm were formed. Thereafter, the interval of the holes was measured using a pin gauge (the length is defined as L). These samples were heated for 30 sec. in contact with a heat block heated to 120° C., under the non-tension. These samples were humidified at 25° C., 60% RH for 5 hours, and the interval of the holes was measured using a pin gauge (the length is defined as L'). Based on these lengths, $\{L'-L\}/L$ was calculated for each of the 5 points, and further a ratio of the maximum to the minimum (the maximum/the minimum) of these values was measured for each of MD and TD.

(4) Dimensional change at immediately after heat development

A sample is cut to the size of 5 cm width and 25 cm length in the transverse direction (TD) and in the longitudinal direction (MD), and holes with an intervals of 20 cm are formed. This sample is subjected to heat-development for 30 seconds in contact with a heat block heated to 115° C., under the non-tension. This sample is allowed to stand at 25° C. and 60% RH, and thereafter a dimensional change is measured. That is, the dimension in 3 minutes after the heat development (the length is defined as L3) and the dimension in 120 minutes after the heat development (the length is defined as L120) are measured using a pin gauge, and the dimensional change at immediately after the heat development is obtained according to the following equation:

Dimensional change (%) at immediately after heat development=$100\times(L120-L3)/L3$ (5) Dimensional change before and after heat development A sample is cut to the size of 5 cm width and 25 cm length in the MD and TD, and it is humidified at 25° C. and 60% RH for 24 hours, and thereafter holes with an interval of 20 cm are formed. Thereafter, the interval of the holes is measured using a pin gauge (the length is defined as L(f)). This sample is subjected to heat-development for 30 seconds in contact with a heat block heated to 115° C. under a non-tension. After this sample is humidified at 25° C. and 60% RH for 24 hours, the interval of the holes is measured using a pin gauge (the length is defined as L(d)). Based on these lengths, the dimensional change before and after the heat development is obtained according to the following equation:

Dimensional change (%) before and after heat=100×{L(d)−L(f)}/L(f) development (6) Time needed to reach ½ of the saturated moisture-absorption amount A sample is cut to the size of 5 cm width and 25 cm length in the MD and TD, and it is humidified at 25° C. and 20% RH for 24 hours. Thereafter, holes with an interval of 20 cm are formed. Thereafter, the interval of the holes is measured using a pin gauge (the length is defined as L). This sample is moved to a room at 25° C. and 70% RH. From this time, the interval of the holes is measured at 30-minute intervals. The dimension stretches with the lapse of time, and eventually converges into a definite value. This length is defined as L'. The time required to reach the length of (L+L')/2 is measured by interpolation, and the time thus obtained is defined as "the time needed to reach ½ of the saturated moisture-absorption amount".

(7) Water vapor permeability coefficient

Two vessels that are separated by a sample film are each evacuated. Then a water vapor of 92% RH is introduced into a primary vessel. An amount of the water vapor flowed from the primary vessel to a secondary vessel permeated through the film, is measured at 25° C. using a vacuum gauge. Such an amount is measured with the lapse of time. A water vapor pressure (cmHg) of the secondary vessel at the axis of ordinates and a time (second) at the axis of abscissas, are taken, to prepare a permeation curve. Based on a gradient of the straight line portion on this permeation curve, the water vapor permeability coefficient is obtained according to the following equation:

Water vapor permeability coefficient $(cm^3(STP) \cdot cm^{-1} \cdot sec^{-1} \cdot cmHg^{-1})=(\Delta p/\Delta t) \times (V/760) \times (\lambda/p \cdot a)$ $\Delta p/\Delta t$: Gradient of the straight line portion on the permeation curve V: Volume ($cm^3$) of the secondary vessel l: Thickness (cm) of the film p: Water vapor pressure (cmHg) of the primary vessel a: Thickness (cm) of the film The polyester support of the present invention is excellent in a dimensional stability, and it is preferably suitable for a support of the heat-development photographic light-sensitive material. Accordingly, a heat-development photographic light-sensitive material of the present invention using such a support, shows an excellent dimensional stability upon a heat development and during storage, and further it exhibits an excellent effect on that a distortion of an image and color discrepancy occurred by a pile of multi-colors can be prevented.

The present invention will be described in more detail with reference to the following Examples, but the invention should not be construed as being limited thereto.

EXAMPLES

Example-1

(1) Preparation of support (1-1) Preparation of a polyethylene terephthalate (PET) support ① Polymerization of PET A PET of an IV (intrinsic viscosity)=0.66 (measured at 25° C. in phenol/tetrachloroethane =6/4 (weight ratio)) was obtained using terephthalic acid and ethylene glycol, according to a usual method. Using a scanning-type differential thermal analyzer (DSC) and 10 mg of a sample of the PET, measurement was performed in a stream of nitrogen, raising the temperature at a rate of 20° C./minute. Consequently, the sample had a Tg of 70° C. and a Tm of 255° C.

② Formation of a film of PET

Pellets of the PET were prepared, and then they were dried at 130° C. for 4 hours, melted at 300° C., extruded from a T-die, and then rapidly cooled (70° C.), to prepare an unstretched film, so that the unstretched film had a thickness of 120 μm after thermal fixation.

The thus-obtained unstretched film was stretched in the MD to 3.3-folds at 100° C., then it was stretched in the TD to 4.0-folds at 110° C. Thereafter, after thermally fixing at 240° C. for 90 sec., the stretched film was subjected to relaxation by 0% or 3% to the TD at 235° C. Thus, the films each having a width of 3 meters were obtained. Thereafter, after trimming both ends of the film to 2.5 meters, the film was wound. These films were designated as PET-1 and PET-2, respectively (the latter had a smaller dimensional stability in the transverse direction due to the TD relaxation).

(1-2) Preparation of a polyethylene-2,6-naphthalate (PEN) support

① Polymerization of PEN

A PEN of an IV=0.58 (measured at 25° C. in phenol/tetrachloroethane=6/4 (weight ratio)) was obtained using dimethyl naphthalene-2,6-dicarboxylate and ethylene glycol, according to a usual method. Using a DSC and 10 mg of a sample of the PEN, measurement was performed in a stream of nitrogen, raising the temperature at a rate of 20° C./minute. Consequently, the sample had a Tg of 120° C. and a Tm of 265° C.

② Formation of a film of PEN

Pellets of the PEN were prepared, and they were dried at 150° C. for 4 hours, melted at 320° C., extruded from a T-die, and then rapidly cooled (70° C.), to prepare an unstretched film, so that the unstretched film had a thickness of 120 μm after thermal fixation.

The thus-obtained unstretched film was stretched in the MD to 3.1-folds at 140° C., then it was stretched in the TD to 3.6-folds at 145° C. Thereafter, after thermally fixing at 250° C. for 90 sec., the stretched film was subjected to relaxation by 2% to the TD at 245° C. Thus, the film having a width of 3 meter was obtained. Thereafter, after trimming both ends of the film to 2.5 meters, the film was wound.

(2) Preparation of an undercoat layer and a backing layer

On the above support, the following undercoat layers and backing layers were provided.

(2-1) Surface treatment

Prior to coating, corona discharge treatment was applied to both surfaces of the support to be coated.

Apparatus: a solid state corona discharging machine, Model 6 KVA, trade name, manufactured by Piller Co.

Conditions: temperature=room temperature, speed of the treatment=20 meters/minute, intensity=0.375 kV·A·minute/m², treating frequency=9.6 kHz, gap clearance between the electrode and the dielectric roll= 1.6 mm (2-2) Undercoat first layer A water-dispersed latex having the following composition was coated on the support, using a wire bar, so that the dry thickness of the layer would be 0.3 μm, followed by drying at 120 ° C. for 2 minutes.

| | |
|---|---|
| Butadiene-styrene copolymer latex (solid content 43%, butadiene/styrene (weight ratio) = 32/68) | 13 ml |
| 2,4-Dichloro-6-hydroxy-s-triazine sodium salt 8% aqueous solution | 7 ml |
| Sodium laurylbenzenesulfonate 1% aqueous solution | 1.6 ml |
| Distilled water | 80 ml |

(3) Undercoat second layer

An aqueous solution having the following composition was coated on the undercoat first layer, using a wire bar, so that the dry thickness of the layer would be 0.14 μm, followed by drying at 120° C. for 2 minutes.

| | |
|---|---|
| Gelatin | 0.9 g |
| Methylcellulose (Metolose SM15, trade name, a substitution degree of 1.79 to 1.83) | 0.1 g |
| Acetic acid (concentration 99%) | 0.02 ml |
| Distilled water | 99 ml |

(2-4) Backing first layer (electrically conductive layer)

An acrylic latex water-dispersed liquid of the following composition containing an electrically conductive material was coated on the support surface opposite to the undercoat surface, so that the dry thickness of the layer would be 0.04 μm, and it was dried at 180° C. for 30 seconds, to prepare a support having a surface electric resistance of $10^6 \Omega$.

| | |
|---|---|
| Acrylic resin aqueous dispersion (Jurymer ET410, trade name, solid content 20 wt. %, made by Nihon Junyaku K.K.) | 2.0 wt. parts |
| Tin oxide-antimony oxide aqueous dispersion (average particle size 0.1 μm, 17 wt. %) | 18.1 wt. parts |
| Polyoxyethylene phenyl ether | 0.1 wt. parts |

To the above mixture, distilled water was added to make 100 wt parts in total.

(2-5) Backing second layer (Color-forming•matting layer)

A coating solution having the following composition was coated on the first backing layer, so as to be 0.7 in optical density at 660 nm after coated and dried.

(Preparation of a color-forming agent dispersion A)

2.5 g of the following Compound 1 and 1 g of a crosslinking PMMA fine particles having an average particle size of 5 μm, were added to 35 g of ethyl acetate, and the contents were mixed. 50 g of a 10 wt % solution of polyvinyl alcohol previously dissolved, was added to the resultant solution, and then the contents were dispersed by a homogenizer for 5 minutes. Thereafter, ethyl acetate was removed from the dispersion by a desolvation, and then the dispersion was diluted with water, to prepare the color-forming agent dispersion.

Compound 1

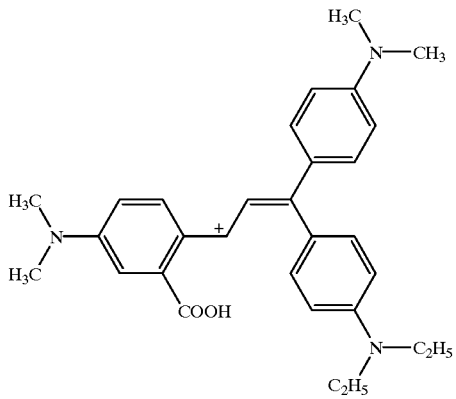

(2-6) Backing third layer (polyolefin layer: slippery layer)

A polyolefin latex water-dispersed liquid of the following composition was coated on the color-forming layers, so that the dry thickness of the layer would be 0.15 μm. Then, the obtained material was dried at 185° C. for 3 minutes.

| | |
|---|---|
| Polyolefin (Chemipearl S-120, 27 wt. %, trade name, made by Mitsui Petrochemical Industries, Ltd.) | 3.0 wt. parts |
| Colloidal silica (Snow Tex C, trade name, made by Nissan Chemical Industries, Ltd.) | 2.0 wt. parts |
| Epoxy compound (Denacol EX-614B, trade name, made by Nagase Kasei K.K.) | 0.3 wt. parts |

To the above solution, distilled water was added to make 100 wt. parts in total.

(2-7) Thermal dimensional change of the polyester support not yet subjected to heat treatment (a raw film) For the PET-1, -2 and PEN supports (raw films) each having already been coated thereon the undercoat layers and backing layers, a ratio of the maximum to the minimum in the transverse direction of the thermal dimensional changing amount at 120° C. for 30 sec. was measured according to the above-described method, respectively. The thus-obtained results are described in Table 1.

(3) Heat treatment

After slitting the center portion of the raw film having already been coated thereon the above-described undercoat layer and backing layer, to the width of 1.5 meters, knurl having a height of 10 μm and a width of 10 mm was applied to both ends of the film. Thereafter, a heat treatment was carried out, conveying the film through the heat-treatment zone, so that a MD shrunk amount and its completion time, and also a TD stretched amount and its completion time would be those shown in Table 1. This was accomplished by the following method:

TD; Both ends of the support were grasped, and the support was stretched, so that a stretched amount and a completion time would be those as shown in Table 1.

MD; The interval of chucks with which the support was grasped, was made to be getting close, so that a shrunk amount and a completion time would be those as shown in Table 1.

Further, in Comparative example 2, a heat treatment was carried out at 175° C. for 5 minutes, without regulating the above MD and TD, according to Example 1 of JP-A-8-211547.

TABLE 1

Condition for heat treatment

| | Raw film | Maximum/minimum ratio in TD of dimensional change at 120° C. for 30 sec | | Heat treatment condition | | MD shrinkage | | TD stretch | |
|---|---|---|---|---|---|---|---|---|---|
| | kind | MD | TD | Temp. ° C. | Time sec | Shrunk amount % | Time up to completion sec | Stretched amount % | Time up to completion sec |
| This invention-1 | PET-2 | 1.10 | 1.05 | 160 | 60 | −0.8 | 60 | +0.25 | 15 |
| This invention-2 | PET-2 | 1.10 | 1.05 | 190 | 280 | −1.8 | 280 | +0.38 | 19 |
| This invention-3 | PET-2 | 1.10 | 1.05 | 145 | 20 | −0.3 | 20 | +0.01 | 6 |
| This invention-4 | PET-2 | 1.10 | 1.05 | 160 | 20 | −0.7 | 18 | +0.15 | 15 |
| This invention-5 | PET-2 | 1.10 | 1.05 | 170 | 150 | −1.2 | 120 | +0.08 | 10 |
| This invention-6 | PET-2 | 1.10 | 1.05 | 180 | 100 | −1.5 | 90 | +0.20 | 12 |
| This invention-7 | PET-1 | 1.35 | 1.20 | 160 | 120 | −1.4 | 110 | +0.32 | 9 |
| This invention-8 | PEN | 1.22 | 1.15 | 155 | 200 | −1.0 | 170 | +0.30 | 18 |
| Comparative example-1 | PET-2 | 1.35 | 1.20 | 160 | 60 | −0.5 | 35 | −0.5 | 45 |
| Comparative example-2 | PET-2 | 1.10 | 1.05 | 175 | 300 | −2.1 | 300 | −1.8 | 300 |

(4) Dimensional stability test of a polyester support

The polyester support after a heat treatment was tested according to the above-described method. The thus-obtained results are shown in Table 2.

TABLE 2

Test results on dimensional stability of a support after heat treatment

| | Thermal dimensional change | | Difference between maximum and minimum in TD | | Dimensional change with the lapse of time after heating | | Difference between maximum and minimum in TD | |
|---|---|---|---|---|---|---|---|---|
| | MD % | TD % | MD % | TD % | MD % | TD % | MD % | TD % |
| This invention-1 | −0.01 | +0.02 | 0.01 | 0.00 | +0.02 | +0.01 | 0.01 | 0.01 |
| This invention-2 | +0.01 | +0.02 | 0.00 | 0.00 | +0.00 | −0.02 | 0.00 | 0.00 |
| This invention-3 | −0.03 | +0.03 | 0.02 | 0.03 | +0.03 | +0.03 | 0.02 | 0.02 |
| This invention-4 | −0.02 | +0.02 | 0.02 | 0.01 | +0.04 | +0.02 | 0.03 | 0.02 |
| This invention-5 | 0.00 | −0.01 | 0.01 | 0.02 | +0.01 | +0.02 | 0.01 | 0.02 |
| This invention-6 | 0.00 | +0.02 | 0.01 | 0.01 | +0.01 | +0.00 | 0.01 | 0.00 |
| This invention-7 | −0.03 | +0.03 | 0.03 | 0.03 | +0.05 | +0.02 | 0.04 | 0.03 |
| This invention-8 | −0.01 | +0.02 | 0.01 | 0.01 | +0.01 | +0.01 | 0.02 | 0.01 |
| Comparative example-1 | −0.05 | +0.04 | 0.05 | 0.03 | +0.06 | −0.04 | 0.06 | 0.03 |
| Comparative example-2 | −0.09 | +0.06 | 0.07 | 0.05 | +0.07 | −0.05 | 0.07 | 0.04 |

As is apparent from the results shown in Table 2, it is found that when a heat treatment was not carried out, so that a support would be shrunk in the MD and stretched in the TD, and that the TD stretch would have been completed before the MD shrinkage be completed, the dimensional stability was quite poor, that is, a dimensional change with the lapse of time after heating was large both in MD and TD; a thermal dimensional change in MD was large; and a difference between the maximum and the minimum of the thermal dimensional change measured along the transverse direction and of the dimensional change with the lapse of time after heating in MD, were also large (Comparative example 1). Similarly, when a heat treatment was carried out without regulating MD and TD, it is also found that the dimensional stability both upon heating and with the lapse of time was quite poor (Comparative example 2).

In contrast, it is found that the Present invention-1 to -8 each showed an excellent dimensional stability both upon heating and with the lapse of time, because a dimensional change upon heating, a dimensional change with the lapse of time, and a difference between the maximum and the minimum of a dimensional change both in MD and TD measured along the transverse direction each corresponding to these, were quite small, respectively, as compared to those in the comparative examples.

(5) Preparation of a light-sensitive material

The following styrene-butadiene rubber latex (SBR)-series light-sensitive layer was coated on the undercoat layer-coating side of the support of a width 1.5 m, which support has been coated the above-described undercoat layers and backing layers, followed by subjecting to heat treatment.

SBR-series light-sensitive layer
(Preparation of silver halide grains A)

22 g of a phthalated gelatin and 30 mg of potassium bromide were dissolved in 700 ml of water. After adjustment of the pH to 5.0 at a temperature of 40° C., 159 ml of an aqueous solution containing 18.6 g of silver nitrate, and an aqueous solution containing potassium bromide were added to the resulting solution, over 10 minutes, according to the controlled double jet method, with the pAg kept to be 7.7. Further, an aqueous solution containing $8 \times 10^6$ mol/l of $K_3[IrCl_6]^{3-}$ and 1 mol/l of potassium bromide was added thereto, over 30 minutes, according to the controlled double jet method, with the pAg kept to be 7.7. Thereafter, the pH and the pAg were adjusted to 5.9 and 8.0, respectively.

The thus-obtained silver halide grains were cubic grains having an average grain size of 0.07 μm, a deviation coefficient of a diameter of a projected area of 8%, and a (100) area ratio of 86%.

The above-described silver halide grains C were warmed to the temperature of 60° C. To the warmed grains, were added $8.5 \times 10^{-5}$ mol of sodium thiosulfate, $1.1 \times 10^{-5}$ mol of 2,3,4,5,6-pentafluorophenyldiphenylsulfinselenide, $2 \times 10^{-6}$ mol of the following Tellurium compound 1, $3.3 \times 10^{-6}$ mol of chloroauric acid, and $2.3 \times 10^{-4}$ mol of thiocyanic acid, per mol of silver, respectively, and then the resultant mixture was allowed to ripen for 120 minutes. Thereafter, $8 \times 10^{-4}$ mol of the following Sensitizing dye C was added to the mixture, with stirring, after the temperature was cooled to 50° C., followed by addition of $3.5 \times 10^{-2}$ mol of potassium iodide. After the resultant mixture was stirred for 30 minutes, it was rapidly cooled to 30° C., to finish preparation of the silver halide.

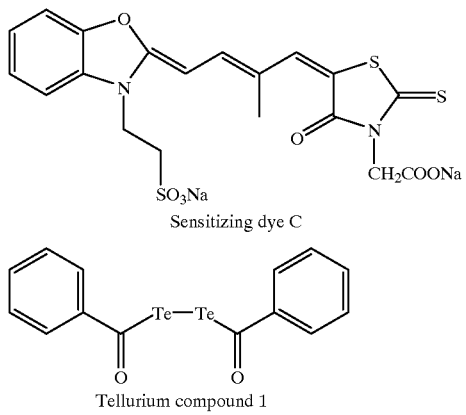

Sensitizing dye C

Tellurium compound 1

(Preparation of a dispersion of fine crystals of a silver salt of an organic acid)

40 g of behenic acid, 7.3 g of stearic acid, and 500 ml of a distilled water were mixed at 90° C. for 15 minutes. To the resultant mixture, 187 ml of a 1N-NaOH aqueous solution was added, with vigorous stirring, over 15 minutes, followed by 61 ml of a 1N-nitric acid aqueous solution, and then cooling to 50° C. Thereafter, 124 ml of a 1N-nitric acid aqueous solution was added to the resultant mixture, and they were stirred for 30 minutes. Thereafter, solid contents were separated by suction filtration, and then the separated solid contents were washed with water, until the conductivity of the filtrate became 30 μS/cm. The thus-obtained solid contents were used in the form of a wet cake without drying them. 12 g of polyvinyl alcohol and 150 ml of water were added to the wet cake, corresponding to 34.8 g of the dry solid contents, and they were mixed well, to obtain a slurry. 840 g of zirconia beads (average diameter, 0.5 mm) provided together with the slurry were placed in a vessel, and they were dispersed for 5 hours using a dispersing machine (1/4G-sand grinder mill, manufactured by IMEX Co., Ltd.), to obtain a dispersion of fine crystals of a silver salt of an organic acid having a volume weighted average size of 1.5 μm. Measurement of the average grain size was carried out using a Master Saizer X, trade name, manufactured by Malvern Instruments Ltd.

(Preparation of a dispersion of solid material fine particles)

Dispersions of solid fine particles of any of tetrachlorophthalic acid, 4-methylphthalic acid, 1,1-bis(2-hydroxy-3,5-dimethylphenyl)-3,5,5-trimethylhexane, phthalazine, and tribromomethylsulfonylbenzene were prepared, respectively.

0.81 g of hydroxypropyl cellulose and 94.2 ml of water were added to tetrachlorophthalic acid. The resultant mixture was stirred well, to make a slurry, and the slurry was allowed to stand for 10 hours. Thereafter, the slurry and 100 ml of zirconia beads (average diameter, 0.5 mm) were placed in a vessel, and they were dispersed for five hours, using a dispersing machine of the same type used to prepare the dispersion of fine crystals of a silver salt of an organic acid, to obtain a dispersion of tetrachlorophthalic acid solid fine crystals. 70 wt % of the solid fine particles had a particle size of 1.0 μm.

(Preparation of a coating solution for a photographic emulsion layer)

The following composition was added to the previously prepared dispersion of fine crystals of a silver salt of an organic acid, to prepare a coating solution for a photographic emulsion layer.

| | |
|---|---|
| Dispersion of fine crystals of a silver salt of an organic acid | 1 mol |
| Silver halide grains A | 0.05 mol |
| Binder, SBR latex (LACSTAR 3307B, trade name, manufactured by Dainippon Ink and Chemicals, Incorporated) | 430 g |
| Material for development: | |
| Tetrachlorophthalic acid | 5 g |
| 1,1-Bis(2-hydroxy-3,5-dimethylphenyl)-3,5,5-trimethylhexane | 98 g |
| Phthalazine | 9.2 g |
| Tribromomethylphenol sulfone | 12 g |
| 4-Methylphtharic acid | 7 g |
| Hydrazine nucleating agent | $5.0 \times 10^{-3}$ mol |
| | Ag 1 mol |

(Preparation of a coating solution for an emulsion- protective layer)

The following composition was added to an inert gelatin, to prepare a coating solution for the emulsion-protective layer.

| | |
|---|---|
| Inert gelatin | 10 g |
| Surfactant A | 0.26 g |
| Surfactant B | 0.09 g |
| Matting agent (PMMA having av. grain diameter of 3 μm) | 1 g |
| 1,2-(Bisvinylsulfoneacetamide)ethane | 0.3 g |
| Water | 64 g |

Hydrazine nucleating agent

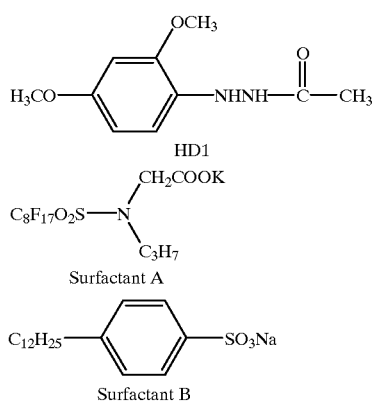

HD1

Surfactant A

Surfactant B (6) Heat development test of a light-sensitive material

Using a light-sensitive material having the support coated thereon the above photographic constituent layer, a dimensional change with the lapse of time and a dimensional change due to a heat development were measured, according to the above-described methods. The thus-obtained results are shown in Table 3. In the table, discrepancy of the printing plates was measured as follows.

A square having a side of 60 cm was successively drawn onto the light-sensitive material using a scanner, so as to make two printing plates, and then they were subjected to heat development at 115° C. for 30 sec. One of these printing plates was heat-treated in an air thermostat at 55° C. for 72 hours, followed by humidification at 25° C., 60% RH for 5 hours. After another printing plate was stored at 25° C., 60% RH, these printing plates were superimposed, to evaluate the discrepancy of the plates by means of a loupe.

between the maximum and the minimum of the dimensional change in MD and TD measured along the transverse direction each corresponding to these changes, were quite small, similarly to the results (Table 2) of the support on which a light-sensitive layer has not yet coated.

Example-2

(1) Preparation of a film (hereafter referred to as a support)

(1-1) Preparation of Supports-1 to -6

① Polymerization of PET

② Formation of a film of PET

A PET was obtained and an unstretched film of the PET was prepared in the same manner as in the above Example 1.

The thus-obtained unstretched film was stretched in the MD to 3.3-folds at 100° C., and it was stretched in the TD to 4.0-folds at 110° C. Thereafter, after thermally fixing at 240° C. for 90 sec., the stretched film was subjected to relaxation by 0% or 3% to the TD at 235° C., followed by winding it.

③ Coating of a vinylidene chloride layer, an undercoat layer

Onto the both sides of the PET support, a dilution of a vinylidene chloride latex (PVdC: L551B, trade name, manufactured by Asahi Chemical Industry Co., Ltd.) diluted with water into a half of concentration, was coated using a wire bar, so that a thickness of the layer would be the thickness as shown in Table 4, followed by drying it at 120° C. for 2 minutes. Further, on one side (a light-sensitive layer-coating side) of this support, an aqueous solution for an undercoat layer having the composition described below was coated using a wire bar, so that a dry thickness of the layer would be 0.14 μm, followed by drying it at 180° C. for 3 minutes.

TABLE 3

Results in heat-development test of a light-sensitive material

| | Dimensional change due to heat-development | | | | Dimensional change with the lapse of time after heat-development | | | | |
|---|---|---|---|---|---|---|---|---|---|
| | | | Difference between maximum and minimum in TD | | | | Difference between maximum and minimum in TD | | |
| | MD % | TD % | MD % | TD % | MD % | TD % | MD % | TD % | Discrepancy in the plate |
| This invention-1 | −0.00 | +0.02 | 0.01 | 0.00 | +0.02 | +0.02 | 0.01 | 0.01 | none |
| This invention-2 | +0.02 | +0.02 | 0.02 | 0.01 | +0.01 | −0.02 | 0.01 | 0.00 | none |
| This invention-3 | −0.03 | +0.02 | 0.02 | 0.02 | +0.04 | +0.02 | 0.01 | 0.02 | none |
| This invention-4 | −0.02 | +0.02 | 0.01 | 0.01 | +0.03 | +0.02 | 0.02 | 0.01 | none |
| This invention-5 | +0.01 | −0.01 | 0.00 | 0.00 | +0.01 | +0.02 | 0.01 | 0.01 | none |
| This invention-6 | 0.00 | +0.02 | 0.00 | 0.01 | +0.01 | +0.01 | 0.01 | 0.01 | none |
| This invention-7 | −0.04 | +0.02 | 0.02 | 0.03 | +0.02 | +0.02 | 0.03 | 0.03 | none |
| This invention-8 | −0.01 | +0.01 | 0.02 | 0.01 | +0.01 | +0.01 | 0.00 | 0.01 | none |
| Comparative example-1 | −0.06 | +0.04 | 0.05 | 0.03 | +0.06 | −0.04 | 0.06 | 0.04 | occurred |
| Comparative example-2 | −0.08 | +0.07 | 0.07 | 0.05 | +0.07 | −0.05 | 0.07 | 0.06 | occurred |

As is apparent from the results shown in Table 3, it is found that the light-sensitive materials of the Present invention-1 to -8 each showed an excellent thermal dimensional stability and storability, that is, a dimensional change due to a heat development, a dimensional change with the lapse of time after the heat development, and a difference

| | |
|---|---|
| Gelatin | 0.9 g |
| Methylcellulose (Metolose SM15, trade name, a substitution degree of 1.79 to 1.83) | 0.1 g |

-continued

| | |
|---|---|
| Acetic acid (concentration 99%) | 0.02 ml |
| Distilled water | 99 ml |

④ Backing first layer (electrically conductive layer)
⑤ Backing second layer (Color-forming/matting layer)
⑥ Backing third layer (polyolefin layer: slippery layer)

The backing first to third layers were provided by coating on the support surface opposite to the undercoat surface, in the same manner as in the Example 1.

(1-2) Preparation of Film-7 (hereinafter referred to as a support)

On the both sides of a PET support film-formed in the same manner as the Support-1, a silica layer described in Example 1 of JP-A-8-224795 was formed by a sputtering method. On one side (a light-sensitive layer-coating side) of the above-described support, a vinylidene chloride layer, an undercoat layer was formed in the same manner as the Support-1. On the opposite side of the support, the backing first to third layers were coated in the same manner as the Support-1.

(1-3) Preparation of Supports-8, 9 (hereinafter referred to as supports)

On the both sides of a PET support film-formed in the same manner as the Support-1, a mica dispersion solution 1 or 2 each having the composition as described below, was coated, so that a dry thickness of the mica layer would be as shown in Table 4. The resulted support was dried at 115° C. for 3 minutes.

| Mica dispersion solution-1 | |
|---|---|
| Vinylidene chloride latex (L551B, trade name, manufactured by Asahi Chemical Industry Co., Ltd.) | 20 weight parts |
| Aqueous dispersion of synthetic mica powder (av. particle diameter of 0.1 μm, 20 wt %) | 15 weight parts |
| Polyoxyethylene phenyl ether | 0.1 weight parts |
| Distilled water to make | 100 weight parts |
| Mica dispersion solution-2 | |
| Gelatin | 5 weight parts |
| Aqueous dispersion of synthetic mica powder (av. particle diameter of 0.1 μm, 5 wt %) | 2.5 weight parts |
| Polyoxyethylene phenyl ether | 0.1 weight parts |
| Distilled water to make | 100 weight parts |

The undercoat layer was formed on one side (a light-sensitive layer-coating side) of the support in the same manner as the Support-1. On the opposite side of the support, the backing first to third layers were coated in the same manner as the Support-1. The support having been coated thereon the mica dispersion solution-1 is designated as "Support-8", while the support having been coated thereon the mica dispersion solution-2 is designated as "Support-9".

(1-4) Preparation of Support-10 (hereinafter referred to as a support)

On the both sides of a PET support film-formed in the same manner as the Support-1, a polyvinyl alcohol resin dispersion solution (PVOH: PVA117, trade name, manufactured by Kuraray Co., Ltd.) was coated, so that a dry thickness would be as shown in Table 4, followed by drying it at 115° C. for 3 minutes.

The undercoat layer was formed on one side (a light-sensitive layer-coating side) of the above-described support in the same manner as the Support-1. On the opposite side of the support, the backing first to third layers were coated in the same manner as the Support-1.

(1-5) Preparation of Support-11 (hereinafter referred to as a support)

The PET that had been polymerized in the same manner as in the Support-1, and a polyethylene/vinyl alcohol copolymer (EVOH; EVAL EP101, trade name, manufactured by Kuraray Co., Ltd.), were co-extruded at 300° C. using a multimanifold die. The thus-obtained extrusion was quickly cooled, followed by MD stretching to 3.3-folds at 100° C., and then transverse stretching to 4.0-folds at 110° C. Thereafter, after thermally fixing at 240° C. for 90 sec., the resultant stretched film was subjected to relaxation by 0% or 3% to the TD at 235° C., followed by winding. Thus, a support in which the EVOH having a thickness shown in Table 4 was laminated on the both sides of the PET of 120 μm, was obtained. On one side (a light-sensitive layer-coating side) of the above-described support, a vinylidene chloride layer, an undercoat layer was formed in the same manner as the Support-1. On the opposite side of the support, the backing first to third layers were coated in the same manner as the Support-1.

(1-6) Preparation of Support-12 (hereinafter referred to as a support)

The PET that had been polymerized in the same manner as in the Support-1, and the polyethylene naphthalate (PEN) that had been polymerized according to Example 1 of JP-A-8-160565, were co-extruded at 300° C. using a multimanifold die. The thus-obtained extrusion was quickly cooled, followed by MD stretching to 3.3-folds at 130° C., and then transverse stretching to 4.0-folds at 135° C. Thereafter, after thermally fixing at 240° C. for 90 sec., the resultant film was subjected to relaxation by 0% or 3% to the TD at 235° C., followed by winding. Thus, a support in which the PEN having a thickness shown in Table 4 was laminated on the both sides of the PET of 120 μm, was obtained. On one side (a light-sensitive layer-coating side) of the above-described support, a vinylidene chloride layer, an undercoat layer was formed in the same manner as the Support-1. On the opposite side of the support, the backing first to third layers were coated in the same manner as the Support-1.

(2) Low-tension heat-treatment

In order to minimize a dimensional change before and after a heat development, a low-tension heat-treatment was carried out under the conditions shown in Table 4, after the undercoat layer and the backing layers were coated on the support. At any levels, the heat treatment was carried out with the support conveying at the tension of 1.0 kg/cm$^2$.

(3) Moistureproof layer low-temperature treatment

In order to improve the moistureproof property, a heat treatment was carried out under the conditions as shown in Table 4, to the support after the low-tension heat-treatment.

(4) Evaluation of supports

To the thus-obtained support, a dimensional change immediately after the heat development, a dimensional change before and after the heat development, and the time needed to reach a half of the saturated moisture absorption amount were measured, according to the above-described methods. The results thus-obtained are shown in Table 4.

TABLE 4

Preparation and evaluation of a support

| Support 1~12 (This invention) Support 13 (Comparative example) | Moisture proof layer | | | | | Low-temperature treatment of the moistureproof layer | | Crystalline/ amorphous ratio |
|---|---|---|---|---|---|---|---|---|
| | Material | Water vapor permeability coefficient cm³STP · cm⁻¹ · sec⁻¹ · cmHg⁻¹ | Thickness (per one side) μm | Low-tension heat-treatment Temp. °C. | Time min | Temp. °C. | Time hour | 1043/1069 cm⁻¹ |
| Support-1 | PVdC | $1 \times 10^{-9}$ | 2 | 160 | 2 | 100 | 0.1 | 2.2 |
| Support-2 | " | " | 2 | 160 | 2 | — | — | 1.2 |
| Support-3 | " | " | 2 | — | — | 100 | 0.1 | 2.0 |
| Support-4 | " | " | 2 | 180 | 1 | 60 | 10 | 1.6 |
| Support-5 | " | " | 1 | 150 | 5 | 120 | 0.01 | 1.5 |
| Support-6 | " | " | 4 | 200 | 0.5 | 50 | 10 | 1.7 |
| Support-7 | SiO₂ | 0 | 0.06 | 160 | 2 | — | — | |
| Support-8 | Mica (PvdC dispersion) | $5 \times 10^{-10}$ | 2 | 160 | 2 | 100 | 0.2 | |
| Support-9 | Mica (gelatin dispersion) | $1 \times 10^{-10}$ | 1 | 160 | 2 | 100 | 0.1 | |
| Support-10 | PVOH | $9 \times 10^{-8}$ | 10 | 170 | 1 | 80 | 0.5 | |
| Support-11 | EVOH | $6 \times 10^{-10}$ | 1.5 | 155 | 1.5 | 90 | 0.2 | |
| Support-12 | PEN | $5 \times 10^{-9}$ | 3 | 165 | 3 | 70 | 0.8 | |
| Support-13 | — | — | — | 175 | 5 | — | — | |

| Support 1~12 (This invention) Support 13 (Comparative example) | Dimensional change immediately after heat development | | Dimensional change before and after heat development | | Time required to reach 1/2 of the saturated moisture absorption amount |
|---|---|---|---|---|---|
| | MD % | TD % | MD % | TD % | hour |
| Support-1 | +0.01 | +0.01 | +0.00 | +0.01 | 7.5 |
| Support-2 | +0.04 | +0.05 | +0.00 | +0.01 | 1.5 |
| Support-3 | +0.01 | +0.01 | −0.04 | +0.03 | 6.5 |
| Support-4 | +0.02 | +0.02 | +0.01 | +0.02 | 3.5 |
| Support-5 | +0.03 | +0.04 | −0.02 | +0.02 | 2.5 |
| Support-6 | 0 | 0 | +0.01 | +0.01 | 10 |
| Support-7 | 0 | 0 | +0.01 | +0.01 | 78 |
| Support-8 | +0.01 | +0.01 | +0.00 | +0.01 | 26 |
| Support-9 | +0.00 | +0.01 | +0.01 | +0.01 | 35 |
| Support-10 | +0.02 | +0.02 | +0.01 | +0.02 | 8.5 |
| Support-11 | 0 | +0.01 | +0.00 | +0.01 | 12 |
| Support-12 | +0.02 | +0.02 | +0.01 | +0.02 | 5.5 |
| Support-13 | +0.08 | +0.08 | −0.08 | +0.05 | 0.6 |

(5) Preparation of light-sensitive materials

The SBR-series light-sensitive layer was provided by coating on the undercoat layer-side of the support obtained by the above-described method, in the same manner as in the Example 1.

(6) Packaging of light-sensitive materials

The light-sensitive material was subjected to an equilibrium humidification at 25° C. and a humidity described in Table 5, followed by packaging.

(7) Evaluation of light-sensitive materials

For the thus-obtained support, a dimensional change immediately after the heat development, and a dimensional change before and after the heat development were measured, according to the above-described methods. The results obtained are shown in Table 5. Further, a regular square having the side of 60 cm was written in the light-sensitive material using a scanner, and then it was subjected to heat development at 115° C. for 30 seconds. The resultant light-sensitive material that was allowed to stand at 25° C. and 60% RH for 2 hours, was superimposed on the light-sensitive material written the same pattern and immediately after the heat development in the same manner as above, to thereby observe a discrepancy of the printing plates by means of a loupe.

The present invention has achieved an excellent dimensional stability, compared to Comparative Example-1 prepared according to Example 1 in JP-A-8-211547.

TABLE 5

Preparation and evaluation of a support

| Remarks | Support | Humidity when pockaged % | Dimensional change immediately after heat development | | Dimensional change before and after heat development | | Dimension discrepancy between plates |
|---|---|---|---|---|---|---|---|
| | | | MD % | TD % | MD % | TD % | stood 2 hours after heat development |
| This invention | Support-1 | 60 | +0.01 | +0.01 | +0.00 | +0.01 | not occurred |
| " | Support-1 | 80 | +0.00 | +0.00 | +0.00 | +0.01 | " |
| " | Support-1 | 45 | +0.02 | +0.03 | +0.00 | +0.01 | " |
| " | Support-2 | 60 | +0.04 | +0.05 | +0.00 | +0.01 | " |
| " | Support-3 | 60 | +0.01 | +0.01 | −0.04 | +0.03 | " |
| " | Support-4 | 60 | +0.02 | +0.02 | +0.01 | +0.02 | " |
| " | Support-5 | 60 | +0.03 | +0.04 | −0.02 | +0.02 | " |
| " | Support-6 | 60 | 0 | 0 | +0.01 | +0.01 | " |
| " | Support-7 | 60 | 0 | 0 | +0.01 | +0.01 | " |
| " | Support-8 | 60 | +0.01 | +0.01 | +0.00 | +0.01 | " |
| " | Support-9 | 60 | +0.00 | +0.01 | +0.01 | +0.01 | " |
| " | Support-10 | 60 | +0.02 | +0.02 | +0.01 | +0.02 | " |
| " | Support-11 | 60 | 0 | +0.01 | +0.00 | +0.01 | " |
| " | Support-12 | 60 | +0.02 | +0.02 | +0.01 | +0.02 | " |
| Comparative example | Support-13 | — | +0.09 | +0.10 | −0.08 | +0.07 | occurred |

Having described our invention as related to the present embodiments, it is our intention that the invention not be limited by any of the details of the description, unless otherwise specified, but rather be construed broadly within its spirit and scope as set out in the accompanying claims.

What we claim is:

1. A polyester support, which has a dimensional change with the lapse of time after heating which corresponds to a heat development, in a range of from −0.03% to +0.05% both in the longitudinal direction and the transverse direction.

2. The polyester support as claimed in claim 1, wherein the absolute value of a difference between the maximum and the minimum of the dimensional change with the lapse of time after heating which corresponds to a heat development, is in a range of from 0% to +0.04% both in the longitudinal direction and the transverse direction.

3. The polyester support as claimed in claim 2, wherein the absolute value is obtained from values for pieces of the polyester support at regular intervals along the transverse direction for each of the longitudinal direction and the transverse direction, which are measured for the pieces in the transverse direction.

4. The polyester support as claimed in claim 1, wherein a thermal dimensional change due to heating, which corresponds to a heat development, is in a range of from −0.04% to +0.04% both in the longitudinal direction and the transverse direction.

5. The polyester support as claimed in claim 1, wherein the absolute value of a difference between the maximum and the minimum of a thermal dimensional change due to heating, which corresponds to a heat development, is in a range of from 0% to 0.04% both in the longitudinal direction and the transverse direction.

6. The polyester support as claimed in claim 5, wherein the absolute value is obtained from values for pieces of the polyester support at regular intervals along the transverse direction for each of the longitudinal direction and the transverse direction, which are measured for the pieces in the transverse direction.

7. The polyester support as claimed in claim 1, wherein the polyester support is subjected to a heat treatment, so that the polyester shrinks in the longitudinal direction and stretches in the transverse direction, and also that the stretch in the transverse direction is completed before the completion of the shrinkage in the longitudinal direction.

8. The polyester support as claimed in claim 7, wherein the polyester is shrunk by the heat treatment in a range of from −2% to −0.2% in the longitudinal direction, compared to the polyester before the treatment, and the time necessary to complete the shrinkage is in a range of from 15 sec to 5 min.

9. The polyester support as claimed in claim 7, wherein the polyester is stretched by the heat treatment in a range of from more than 0% to +0.4% in the transverse direction, compared to the polyester before the treatment, and the time necessary to complete the stretch is in a range of from 5 sec to 20 sec.

10. The polyester support as claimed in claim 7, wherein the heat treatment is at a temperature of from 140° C. to 200° C. in a time of from 15 sec to 5 min.

11. The polyester support as claimed in claim 7, wherein a ratio of the maximum to the minimum in the transverse direction of a thermal dimensional change obtained by heating at 120° C. for 30 sec is in a range of from 1 to 1.4 both in the longitudinal direction and the transverse direction, in terms of the polyester support before being subjected to the heat treatment.

12. A heat-development photographic light-sensitive material, which comprises a polyester support, having coated thereon a silver halide photographic light-sensitive layer, wherein said material has a dimensional change with the lapse of time after a heat development is in a range of from −0.03% to +0.07% both in the longitudinal direction and the transverse direction, wherein the polyester support has a dimensional change with the lapse of time after heating which corresponds to a heat development, in a range of from −0.03% to +0.05% both in the longitudinal direction and the transverse direction.

13. The heat-development photographic light-sensitive material as claimed in claim 12, wherein said material has an absolute value of a difference between the maximum and the minimum of the dimensional change with the lapse of time after heating which corresponds to a heat development, is in a range of from 0% to +0.04% both in the longitudinal direction and the transverse direction.

14. The heat-development photographic light-sensitive material as claimed in claim 12, wherein said material has a thermal dimensional change due to heating which corresponds to a heat development, is in a range of from −0.04% to +0.04% both in the longitudinal direction and the transverse direction.

15. The heat-development photographic light-sensitive material as claimed in claim 12, wherein said material has an absolute value of a difference between the maximum and the minimum of a thermal dimensional change due to heating, which corresponds to a heat development, is in the range of from 0% to 0.04% both in the longitudinal direction and the transverse direction.

16. The heat-development photographic light-sensitive material as claimed in claim 12, wherein the polyester support is subjected to a heat treatment, so that the polyester shrinks in the longitudinal direction and stretches in the transverse direction, and also that the stretch in the transverse direction is completed before the completion of the shrinkage in the longitudinal direction.

17. The heat-development photographic light-sensitive material as claimed in claim 16, wherein the polyester is shrunk by the heat treatment in a range of from −2% to −0.2% in the longitudinal direction, compared to the polyester before the treatment, and the time necessary to complete the shrinkage is in a range of from 15 sec to 5 min.

18. The heat-development photographic light-sensitive material as claimed in claim 16, wherein the polyester is stretched by the heat treatment in a range of from more than 0% to +0.4% in the transverse direction, compared to the polyester before the treatment, and the time necessary to complete the stretch is in a range of from 5 sec to 20 sec.

19. The heat-development photographic light-sensitive material as claimed in claim 16, wherein the heat treatment is at a temperature of from 140° C. to 200° C. in a time of from 15 sec to 5 min.

20. The heat-development photographic light-sensitive material as claimed in claim 16, wherein said polyester support has a ratio of the maximum to the minimum in the transverse direction of a thermal dimensional change obtained by heating at 120° C. for 30 sec is in a range of from 1 to 1.4 both in the longitudinal direction and the transverse direction, in terms of the polyester support before being subjected to the heat treatment.

21. A low-heat-shrinkage film, which has a dimensional change immediately after heating, which corresponds to a heat development, in a range of from 0% to +0.05% in both the longitudinal direction and the transverse direction.

22. The low-heat-shrinkage film as claimed in claim 21, wherein a thermal dimensional change due to heating, which corresponds to a heat development, is from −0.04% to +0.04% in both the longitudinal direction and the transverse direction.

23. The low-heat-shrinkage film as claimed in claim 21, wherein the time needed to reach one half of the saturated moisture absorption amount is from 1 hour to 100 hours.

24. A laminated material, comprising the low-heat-shrinkage film as claimed in claim 21, and a moistureproof layer having a water vapor permeability coefficient of from 0 to $1 \times 10^{-8}$ ($cm^3$ (STP)·$cm^{-1}$·$sec^{-1}$·$cmHg^{-1}$) laminated on the both sides of the low-heat-shrinkage film.

25. The laminated material as claimed in claim 24, wherein the moistureproof layer comprises a polyvinylidene fluoride, a polyvinylidene chloride, or a polyvinyl alcohol.

26. The laminated material as claimed in claim 25, wherein the moistureproof layer comprises a polyvinylidene chloride, and wherein a ratio I(c)/I(a) of an absorbance (I(c)) at 1043 $cm^{-1}$ that is originated in the crystalline property of the polymer, to an absorbance (I(a)) at 1069 $cm^{-1}$ that is originated in the amorphous property of the polymer, is from 1.2 to 2.5.

27. The low-heat-shrinkage film as claimed in claim 21, wherein the low-heat-shrinkage film is made of an aromatic polyester.

28. A heat-development photographic light-sensitive material, which has a dimensional change immediately after a heat development in the range of from 0% to +0.05% in both the longitudinal direction and the transverse direction.

29. The heat-development photographic light-sensitive material as claimed in claim 28, wherein a thermal dimensional change due to heating, which corresponds to a heat development is from −0.04% to +0.04% in both the longitudinal direction and the transverse direction.

30. The heat-development photographic light-sensitive material as claimed in claim 28, which comprises a low-heat-shrinkage film as a support, wherein the film has a dimensional change immediately after a heat treatment, which corresponds to a heat development, of from 0% to +0.05% in both the longitudinal direction and the transverse direction.

31. The heat-development photographic light-sensitive material as claimed in claim 28, wherein the material comprises a low-heat-shrinkage film as a support, the low-heat-shrinkage film having a dimensional change immediately after heating, which corresponds to a heat development, in a range of from 0% to +0.05% in both the longitudinal direction and the transverse direction, wherein the material has a thermal dimensional change due to heating, which corresponds to a heat development is from −0.04% to +0.04% in both the longitudinal direction and the transverse direction.

32. The heat-development photographic light-sensitive material as claimed in claim 28, wherein the material comprises a low-heat-shrinkage film as a support, the low-heat-shrinkage film having a dimensional change immediately after heating, which corresponds to a heat development, in a range of from 0% to +0.05% in both the longitudinal direction and the transverse direction, wherein the time needed to reach one half of the saturated moisture absorption amount for the material is from 1 hour to 100 hours.

33. The heat-development photographic light-sensitive material as claimed in claim 28, which comprises a low-heat-shrinkage film as a support, the low-heat-shrinkage film having a dimensional change immediately after heating, which corresponds to a heat development, in a range of from 0% to +0.05% in both the longitudinal direction and the transverse direction, and wherein a moistureproof layer having a water vapor permeability coefficient of from 0 to $1 \times 10^{-8}$ (cm$^3$(STP)·cm$^{-1}$·sec$^{-1}$·cmHg$^{-1}$) is laminated on both sides of the low-heat-shrinkage film.

34. The heat-development photographic light-sensitive material as claimed in claim 33, wherein the moistureproof layer comprises a polyvinylidene fluoride, a polyvinylidene chloride, or a polyvinyl alcohol.

35. The heat-development photographic light-sensitive material as claimed in claim 34, wherein the moistureproof layer comprises a polyvinylidene chloride, and wherein a ratio I(c)/I(a) of an absorbance (I(c)) at 1043 cm$^{-1}$ that is originated in the crystalline property of the polymer, to an absorbance (I(a)) at 1069 cm$^{-1}$ that is originated in the amorphous property of the polymer, is from 1.2 to 2.5.

36. The heat-development photographic light-sensitive material as claimed in claim 28, wherein the material comprises a low-heat-shrinkage film made of an aromatic polyester.

* * * * *